US012775249B2

(12) United States Patent
Depeweg et al.

(10) Patent No.: US 12,775,249 B2
(45) Date of Patent: Oct. 27, 2026

(54) METHOD FOR REPRODUCING NOISE COMPONENTS OF LOSSY RECORDED OPERATING SIGNALS, AND CONTROL DEVICE

(71) Applicant: Siemens Aktiengesellschaft, Munich (DE)

(72) Inventors: Stefan Depeweg, Berlin (DE); Kai Heesche, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 652 days.

(21) Appl. No.: 18/266,664

(22) PCT Filed: Nov. 19, 2021

(86) PCT No.: PCT/EP2021/082347

§ 371 (c)(1),
(2) Date: Jun. 12, 2023

(87) PCT Pub. No.: WO2022/128331

PCT Pub. Date: Jun. 23, 2022

(65) Prior Publication Data

US 2024/0045386 A1 Feb. 8, 2024

(30) Foreign Application Priority Data

Dec. 15, 2020 (EP) .................................... 20214204

(51) Int. Cl.
*G05B 13/02* (2006.01)

(52) U.S. Cl.
CPC .................................. *G05B 13/027* (2013.01)

(58) Field of Classification Search
CPC .................................................... G05B 13/027
See application file for complete search history.

(56) References Cited

U.S. PATENT DOCUMENTS

| | | | | | |
|---|---|---|---|---|---|
| 5,706,401 | A * | 1/1998 | Tresp | G06N 3/04 706/25 |
| 5,748,848 | A * | 5/1998 | Tresp | G06N 3/09 706/30 |

(Continued)

FOREIGN PATENT DOCUMENTS

| | | | |
|---|---|---|---|
| CN | 102473338 | A | 5/2012 |
| CN | 109344751 | A | 2/2019 |

(Continued)

OTHER PUBLICATIONS

"Learning und Policy Search in Stochastic Dynamical Systems with Bayesian Neural Networks" by Stefan Depeweg et al., ICLR 2017.

(Continued)

*Primary Examiner* — Khanh B Pham
(74) *Attorney, Agent, or Firm* — Schmeiser Olsen PLLC

(57) ABSTRACT

In order to reproduce noise components of lossy recorded operating signals of a technical system, a neural network is trained to reproduce a recorded target operating signal and a statistical distribution of a stochastic component of the recorded target operating signal on the basis of a recorded input operating signal. A current input operating signal of the technical system is then supplied to the trained neural network. An output signal having a noise component modelled on the statistical distribution is generated on the basis of the supplied current input operating signal and a noise signal. The output signal is then output as the current target operating signal for controlling the technical system.

11 Claims, 3 Drawing Sheets

(56) References Cited

U.S. PATENT DOCUMENTS

| | | | | |
|---|---|---|---|---|
| 5,806,053 | A * | 9/1998 | Tresp | G06N 3/09 706/22 |
| 6,282,529 | B1 | 8/2001 | Neuneier et al. | |
| 8,095,480 | B2 * | 1/2012 | Kristal | G09B 7/06 706/12 |
| 2012/0163127 | A1 | 6/2012 | Gerdes | |
| 2020/0326718 | A1 * | 10/2020 | Kandemir | G06N 5/022 |
| 2021/0110262 | A1 * | 4/2021 | Schmitt | G06N 3/0985 |
| 2021/0397955 | A1 * | 12/2021 | Kandemir | G06N 3/08 |
| 2023/0394368 | A1 * | 12/2023 | Zhang | G06N 3/091 |

FOREIGN PATENT DOCUMENTS

| | | | |
|---|---|---|---|
| DE | 19531967 | A1 | 3/1997 |
| EP | 0901053 | A1 | 3/1999 |
| WO | 2020035683 | A1 | 2/2020 |
| WO | WO 2020035685 | A1 | 2/2020 |

OTHER PUBLICATIONS

"Pattern Recognition and Machine Learning" by Christopher M. Bishop, Springer 2011.

Decomposition of Uncertainty in Bayesian Deep Learning for Efficient and Risk-sensitive Learning by Stefan Depeweg et al., International Conference on Machine Learning, 2018.

PCT International Search Report mailed Feb. 11, 2022 corresponding to PCT International Application No. PCT/EP2021/082347.

* cited by examiner

METHOD FOR REPRODUCING NOISE COMPONENTS OF LOSSY RECORDED OPERATING SIGNALS, AND CONTROL DEVICE

CROSS-REFERENCE TO RELATED APPLICATIONS

This application claims priority to PCT Application No. PCT/EP2021/082347, having a filing date of Nov. 19, 2021, which claims priority to EP Application No. 20214204.8, having a filing date of Dec. 15, 2020, the entire contents all of which are hereby incorporated by reference.

FIELD OF TECHNOLOGY

The following relates to a method for reproducing noise components of lossy recorded operating signals, and control device.

BACKGROUND

Data-driven methods of machine learning are being used to an increasing extent to control complex technical systems, such as, for example, gas turbines, wind turbines, steam turbines, motors, robots, manufacturing installations or motor vehicles. Here, in particular, artificial neural networks are trained to ascertain control-relevant operating signals for controlling the technical system depending on detected operating signals, such as, for example, sensor values of the technical system.

In general, large amounts of operating data from the technical system are required in order to successfully train a data-driven control device. The training data should cover the operating states and other operating conditions of the technical system in the most representative manner possible. Such training data are frequently present in the form of databases, in which a large amount of operating signals is stored, the operating signals having been recorded on the technical system.

Due to bandwidths or space constraints, such training operating signals undergo lossy compression in many cases, however, before being recorded, or are lossy detected at the technical system. In particular in the case of gas turbines, the operating signals available for training purposes are often highly compressed.

One example of a lossy compression or detection of this type is a method, which is also frequently referred to as dead banding, in which a constant value is recorded for a particular operating signal, provided that a change in the operating signal remains below a predefined threshold value. A comparable information loss also arises in a discretization of a particular operating signal.

Such a loss of information, which is frequently irreversible, can significantly impair training of a data-driven control device, however. In known training methods, a lower compression is therefore frequently selected, which increases requirements for storage and/or bandwidth, however. On the other hand, highly compressed training data make it necessary to accept inaccuracies in the data-driven control.

SUMMARY

An aspect relates to a method and a control device that permit more efficient training and/or greater compression of training data.

According to embodiments of the invention, noise components of lossy recorded operating signals of a technical system are reproduced, wherein an input operating signal for a control device of the technical system and a target operating signal for controlling the technical system are lossy recorded. On the basis of the recorded operating signals, a neural network is trained to reproduce a recorded target operating signal and a statistical distribution of a stochastic component of the recorded target operating signal on the basis of a recorded input operating signal. A current input operating signal of the technical system is then supplied to the trained neural network. An output signal having a noise component modelled on the statistical distribution is generated on the basis of the supplied current input operating signal and a noise signal. The output signal is then output as the current target operating signal for controlling the technical system.

Embodiments of the invention are based on the observation that a lossy recording of operating signals also results, in particular, in a loss of information regarding stochastic fluctuations of the operating signals. Such fluctuations result, in particular, from a behavior of a technical system that cannot be determined on the basis of the available operating signals. In many technical systems, however, such a non-determinable or indeterministic behavior forms an essential component of the system behavior. In the case of wind turbines, for example, the exact wind conditions and thus a particular power that can be obtained are/is largely non-determinable.

Correspondingly, simulators or other control devices of a technical system trained with lossy operating signals frequently behave in a more deterministic manner than a real system. For the case in which actual statistical fluctuations are not realistically represented, a reliability or an operating risk of a technical system often cannot be sufficiently precisely evaluated by a control device trained in this way.

By comparison, although an exact course of an indeterministic behavior generally cannot be reconstructed by embodiments of the invention, at least one noise component of a target operating signal that has a realistic statistical distribution can be reproduced. This allows for substantially more realistic forecasts of a behavior of the technical system and thus more efficient training in many cases even with lossy training data. Alternatively or additionally, embodiments of the invention also allow for greater compression of training data.

An appropriate control device, a computer program product (non-transitory computer readable storage medium having instructions, which when executed by a processor, perform actions) and a computer-readable, non-volatile memory medium are provided for carrying out the method according to embodiments of the invention.

In embodiments, the method and the control device according to embodiments of the invention can be carried out and implemented, respectively, for example, by one or multiple computer(s), processor(s), application-specific integrated circuit(s) (ASIC), digital signal processor(s) (DSP) and/or so-called "field programmable gate arrays" (FPGA).

Embodiments and developments of the invention are described in the dependent claims.

According to one embodiment of the invention, a Bayesian neural network having latent parameters representing the statistical distribution can be used as the neural network. The latent parameters can be inferred by the training, in particular, by a variational inference method and/or by a Markov chain Monte Carlo method. The noise signal can be fed into an input layer of the Bayesian neural network. The output signal can then be generated by the Bayesian neural network, which has been trained with the inferred latent parameters, from the current input operating signal and the noise signal. The Bayesian neural network can model stochastic components and thus implement a probabilistic method of supervised learning. Efficient numerical training methods are available for training such a Bayesian neural network with latent parameters.

According to one further embodiment of the invention, the neural network can be trained on the basis of a recorded input operating signal to reproduce statistical characteristic values of the statistical distribution. For the training, in particular, a likelihood function can be used as an error function to be minimized. A multitude of numerical standard methods are available for this purpose. The trained neural network can then be used to determine statistical characteristic values for the supplied current input operating signal. Correspondingly, the noise signal can be generated depending on or according to the determined statistical characteristic values and output as an output signal. In particular, a mean value and a variance of the statistical distribution can be used as characteristic values. In addition, a standard deviation, a probability value and/or a distribution type of the statistical distribution can be used as characteristic values.

According to one further embodiment of the invention, the current input operating signal can be continuously detected and supplied to the neural network. Thus, a concurrent simulator, in particular a digital twin of the technical system, can be operated, in real time, by the neural network. Due to a largely realistic statistic of the stochastic component of the current target operating signal, the simulator can also sufficiently realistically simulate indeterministic behaviors of the technical system.

BRIEF DESCRIPTION

Some of the embodiments will be described in detail, with reference to the following figures, wherein like designations denote like members, wherein.

DETAILED DESCRIPTION

Figure 1:
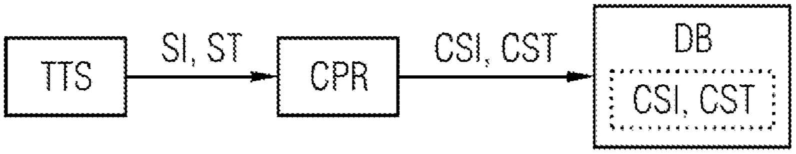
FIG. 1 shows a time curve of operating signals of a technical system prior to and after their lossy compression.
Figure 1:
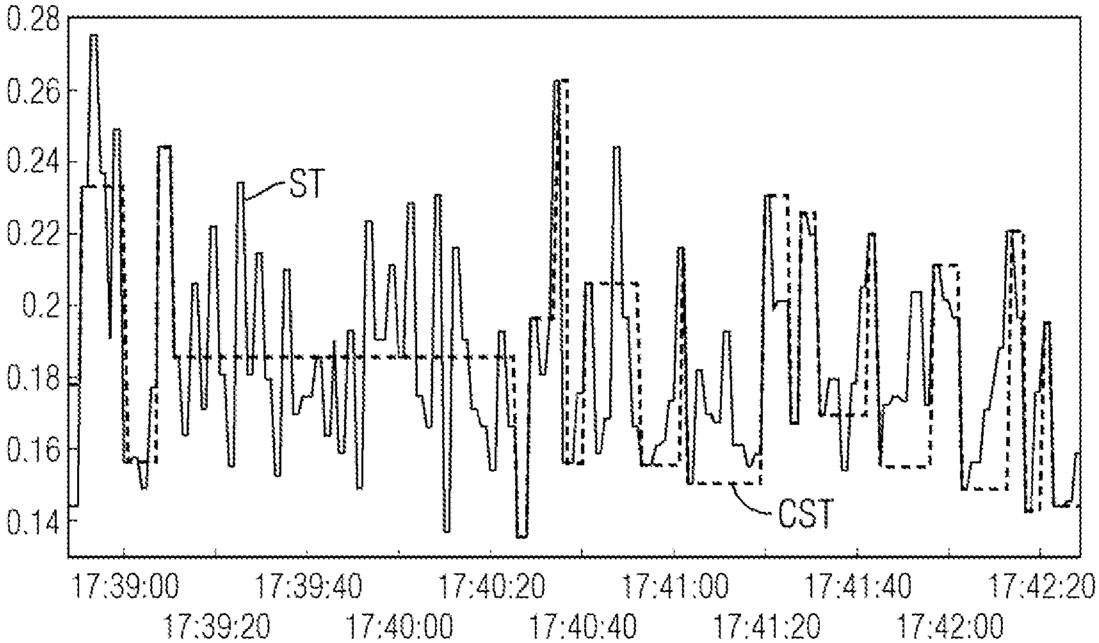

FIG. 1 shows a time curve of operating signals of a technical system TS prior to and after their lossy compression. The technical system TS can be, for example, a gas turbine, a wind turbine, a motor, a robot, a manufacturing installation, a motor vehicle or any other complex technical system.

The operating signals can be measured at the technical system TS using sensors or detected in any other way. The operating signals are to be recorded for the data-based training of a control device for the technical system TS or for an identical or similar technical system.

The operating signals include one or multiple input operating signal(s) SI, which are to be used as input for a control device of the technical system to be controlled. The input operating signals SI can include or represent, for example, sensor data, measured values, state data, control action data, or other data detected at or for the technical system TS for control purposes. In the case of a turbine, the input operating signals SI can include, for example, rotational speed data, temperature data or pressure data.

The operating signals also include one or multiple target operating signal(s) ST, which are required for efficiently controlling the technical system TS. The target operating signals ST can include or represent, in particular, optimized control actions, data regarding effects of control actions, data that are difficult to measure, forecast data or other control-relevant signals or data. In the case of a turbine, the target operating signals ST can include, for example, data regarding combustion dynamics, vibration data and/or data regarding a temperature or pressure distribution at hard-to-reach points of the turbine.

During operation of a complex technical system, large amounts of operating signals, specifically SI and ST in this case, are generally incurred. For this reason, the operating signals are generally compressed. In order to achieve a sufficiently strong compression, lossy compression methods are frequently applied. In a compression method that is also referred to as dead banding, a constant value is recorded for a particular operating signal, provided that a change in the operating signal remains below a predefined threshold value. Alternatively or additionally, the operating signals can also be compressed by a more or less coarse discretization.

For the purpose of compression, the operating signals SI and ST are transmitted from the technical system TS to a compression device CPR. The compression device CPR lossy compresses a particular input operating signal SI to form a compressed input operating signal CSI and lossy compresses a particular target operating signal ST to form a compressed target operating signal CST. The compressed input operating signals CSI and the compressed target operating signals CST are stored in a database DB.

In this way, one or multiple database(s) having a large amount of compressed operating signals CSI and CST can be created by one or multiple technical system(s). As mentioned above, the recorded operating signals CSI and CST are to be used in conjunction with embodiments of the invention to train, in a data-driven manner, a learning-based control device for a technical system to be controlled. It can be expected that training is that much more efficient, the more similar the technical system to be controlled is to the technical system(s) TS, from which the training data (CSI and CST in this case) originate.

The control device is to be trained on the basis of the compressed operating signals CSI and CST to ascertain or predict—on the basis of input operating signals SI of a technical system to be controlled—optimized target operating signals ST for controlling this technical system. In this way, target operating signals that are difficult to measure or are available only at a later point in time are also ascertained or reconstructed, the target operating signals being useful for controlling the technical system.

As mentioned above, information from the original operating signals SI and ST become lost due to the lossy compression, which affects, in particular, a stochastic noise component of the original operating signals SI and ST.

A change in an original target operating signal ST into a compressed target operating signal CST brought about by dead banding is illustrated in the lower part of FIG. 1. The original target operating signal ST is represented by a solid line and the compressed target operating signal CST is represented by a dashed line. The operating signals are plotted with respect to time in arbitrary units. It is shown that many finer structures of the original target operating signal ST can no longer be found in the compressed target operating signal CST. In particular, fluctuations that appear to be stochastic or noise components of the original target operating signal ST are no longer readily apparent in the compressed target operating signal CST.

By the training method according to embodiments of the invention, a neural network is to be trained to reproduce, in particular, a statistical distribution of a stochastic component of the recorded target operating signal CST. By the trained neural network and a noise generator, a noise component of the target operating signal can then be reproduced, the target operating signal having an appropriate statistical distribution.

Training is to be understood to mean, in general, an optimization of a mapping of input data of a machine learning model, specifically of a neural network in this case, onto its output data. This mapping is optimized during its training phase according to criteria that are predefined, learned and/or to be learned. Criteria that can be used are, for example, a reproduction error, a prediction error, a success from an output control action or a similarity with regard to a statistical distribution. Due to the training, for example, networking structures of neurons of a neural network and/or weights of connections between the neurons can be adjusted or optimized such that the predefined criteria are met as well as possible. The training can therefore be construed as an optimization problem. A multitude of efficient optimization methods are available from the field of machine learning for such optimization problems. Optimization is also always to be understood to be an approximation of an optimum.

Figure 2:
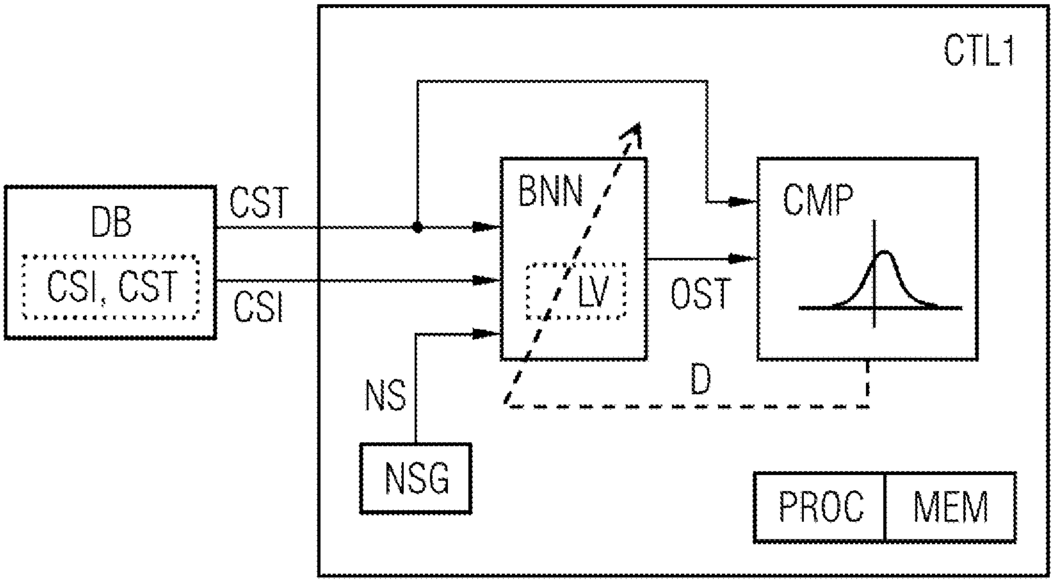
FIG. 2 shows a first control device according to a first exemplary embodiment of the invention in a training phase.

FIG. 2 illustrates a training of a first control device CTL1 according to a first exemplary embodiment of the invention. The first control device CTL1 includes one or multiple processor(s) PROC for carrying out method steps of the control device CTL1 and one or multiple memory/memories MEM for storing data to be processed.

The first control device CTL1 also includes a Bayesian neural network BNN and a noise generator NSG. The noise generator NSG is used to generate a noise signal NS, for example, by a random number generator, which generates pseudo-random numbers or other random data. The term “pseudo-data” or “pseudo-numbers” is intended to also include “pseudo-random data” or “pseudo-random numbers” according to common linguistic usage. In order to train the Bayesian neural network BNN, the compressed input operating signals CSI recorded in the database DB and the compressed target operating signals CST recorded there are read out by the first control device CTL1 and fed into an input layer of the Bayesian neural network BNN as training data. The generated noise signal NS and its data values are fed into the input layer of the Bayesian neural network BNN as further input data.

The Bayesian neural network DNN can be construed as a neural network having a stochastic component modeling statistical distributions. In particular, a probabilistic method of supervised learning can be implemented with the Bayesian neural network BNN.

According to the first exemplary embodiment, the Bayesian neural network BNN is to be trained on the basis of the compressed training data CSI and CST and the noise signal NS to generate a target operating signal OST having an indeterministic, stochastic component on the basis of an input operating signal. A statistical distribution of the generated stochastic component is to correspond to a statistical distribution of a stochastic component of the compressed target operating signal CST. The target operating signal OST is to be output as an output signal or in the form of output data via an output layer of the Bayesian neural network BNN.

Such a stochastic component of the compressed target operating signal CST becomes noticeable, in particular, due to statistical fluctuations of the compressed target operating signal CST at identical values of the input operating signal CST. A statistical distribution of these fluctuations can be quantified, for example, by mean values, variances or other statistical parameters of the fluctuations.

According to the first exemplary embodiment, the indeterministic nature of these fluctuations is modeled, shown or represented by so-called latent parameters LV of the Bayesian neural network BNN. The latent parameters LV thus basically represent the statistical distribution of the stochastic component of the target operating signal.

The latent parameters LV are inferred from the statistical fluctuations in the course of the training of the Bayesian neural network BNN for each data point of the operating signals CSI and CST. The latent parameters LV are estimated, identified or set in such a way that the indeterministic fluctuations induced by the supplied noise signal NS reproduce the stochastic component of the compressed target operating signal CST with respect to its statistical distribution.

For this purpose, a comparison CMP of a statistical distribution of the compressed target operating signals CST with a statistical distribution of the output signal OST is carried out. In particular, mean values and/or variances of the statistical distributions can be compared. The comparison CMP is shown in FIG. 2 outside of the Bayesian neural network BNN. Alternatively or additionally, the comparison CMP can also be carried out entirely or partially within the Bayesian neural network BNN.

A deviation D between the compared statistical distributions ascertained in the comparison CMP is returned to the Bayesian neural network BNN, as indicated by a dashed-line arrow in FIG. 2. The latent parameters LV as the neural weights of the Bayesian neural network BNN are thus optimized in such a way that the deviation D is minimized. In this way, the Bayesian neural network BNN with its latent parameters LV is trained to reproduce a target operating signal and its stochastic component with respect to its statistical distribution on the basis of an input operating signal.

The inference of the latent parameters LV can be carried out, in particular, by a variational inference behavior or by a Markov chain model. These and further efficient training and inference methods for Bayesian neural networks are described, for example, in “Learning and Policy Search in Stochastic Dynamical Systems with Bayesian Neural Networks” by Stefan Depeweg et al., ICLR 2017; in “Decomposition of Uncertainty in Bayesian Deep Learning for Efficient and Risk-sensitive Learning” by Stefan Depeweg et al., International Conference on Machine Learning, 2018 or in “Pattern Recognition and Machine Learning” by Christopher M. Bishop, Springer 2011.

The latent parameters LV and their adaptation to the indeterministic fluctuations induced by the noise signal NS are essential for the correct stochastic behavior of the output target operating signal OST in the first exemplary embodiment. Without the implementation of the latent parameters LV in the Bayesian neural network BNN, however, the trained Bayesian neural network BNN would always deliver the same output, i.e., behave deterministically, for the same input to the real technical system TS. However, the target operating signal OST output by the Bayesian neural network BNN with the latent parameters LV behaves at least partially indeterministically and has a largely realistic statistical distribution. The neural weights of the Bayesian neural network BNN basically represent or model a deterministic component of the target operating signal, i.e., a deterministic functional relationship between the input operating signal and the target operating signal. By comparison, the latent parameters LV basically model or represent a stochastic component, a noise structure or a noise component.

Figure 3:
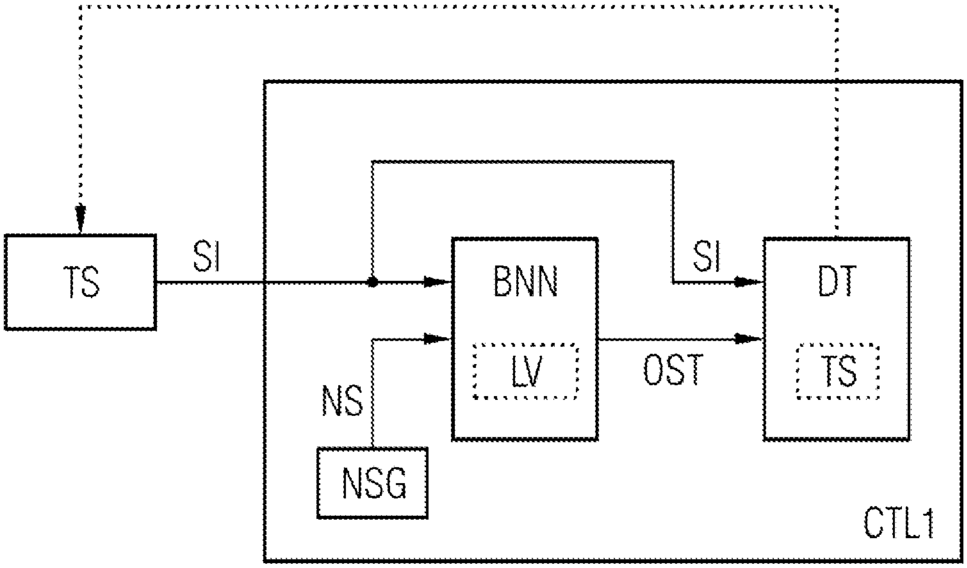
FIG. 3 shows the first control device in an application phase.

FIG. 3 illustrates the first control device CTL1 with the trained Bayesian neural network BNN in an application phase.

The first control device CTL1 receives a current input operating signal SI from the technical system TS and feeds this into the input layer of the trained Bayesian neural network BNN. The technical system TS can be the technical system from which the training data originate, or an identical or similar technical system.

A noise signal NS generated by the noise generator NSG, or the data values of the noise signal NS, is/are fed as further input data into the input layer of the trained Bayesian neural network BNN. An output signal OST is generated from the current input operating signal SI and the supplied noise signal NS by the trained Bayesian neural network BNN at least indirectly depending on the inferred latent parameters LV, the output signal OST being output as a current target operating signal via the output layer of the trained Bayesian neural network BNN. The output signal OST includes a reproduced or reconstructed noise component, which is similar to a noise component of the actual target operating signal ST with respect to its statistics. Due to the latent parameters LV, the Bayesian neural network BNN is enabled to generate or reproduce a realistic indeterministic noise component for the output signal OST as a result of the random excitation by the noise signal NS.

The generated current target operating signal OST is transmitted from the trained Bayesian neural network BNN to a digital twin DT of the technical system TS implemented in the first control device CTL1. Additionally, the current input operating signal SI is also fed into the digital twin DT.

The digital twin DT functions as a concurrent simulator of the technical system TS. As such, the digital twin DT carries out a simulation of the technical system TS, which runs in parallel to the operation of the technical system TS and is continuously updated with operating signals, specifically SI and OST from the technical system TS. Such a simulation of the technical system TS running concurrently in real time makes it possible to monitor the technical system TS in detail and simulatively ascertain relevant state data of the technical system TS for its efficient control. By such data, which have been simulatively ascertained by the digital twin DT, the technical system TS can be controlled in a particularly effective and forward-looking manner, as indicated by a dotted-line arrow in FIG. 3.

Figure 4:
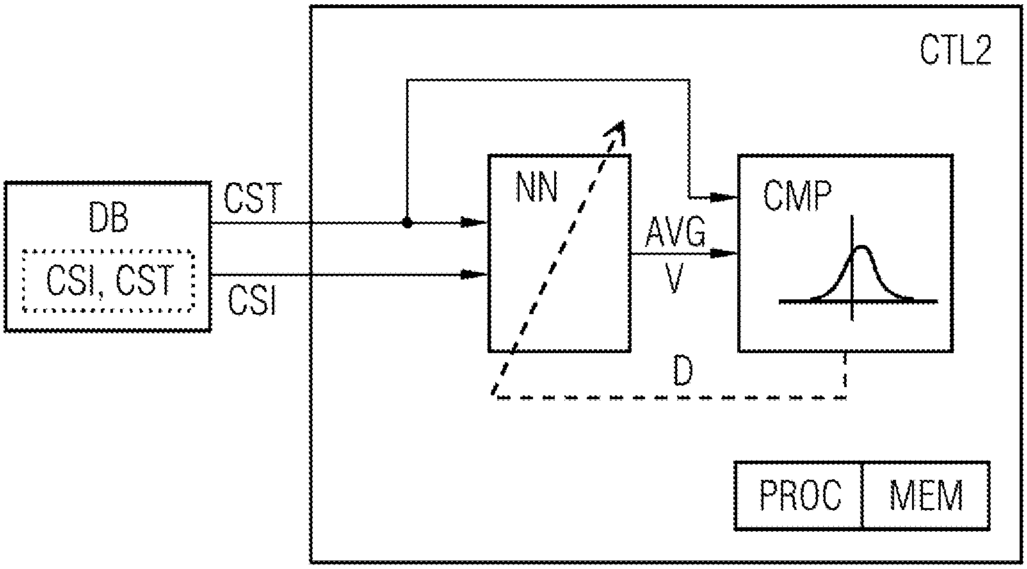
FIG. 4 shows a second control device according to a second exemplary embodiment of the invention in a training phase.

FIG. 4 illustrates a training of a second control device CTL2 according to a second exemplary embodiment of the invention.

The second control device CTL2 includes a neural network NN to be trained. In order to train the neural network NN, the compressed input operating signals CSI recorded in the database DB and the compressed target operating signals CST are read out by the second control device CTL2 and fed into an input layer of the neural network BNN as training data.

The neural network NN is to be trained on the basis of the compressed training data CSI and CST to reproduce statistical characteristic values of a statistical distribution of the stochastic component of the compressed target operating signal CST on the basis of an input operating signal.

In the present exemplary embodiment, a mean value AVG and a variance V of a particular statistical distribution are to be reproduced as statistical characteristic values and output via an output layer of the neural network NN.

Within the scope of the training of the neural network NN, a comparison CMP is carried out between the compressed target operating signals CST and the characteristic values AVG and V output by the neural network NN. The comparison CMP is carried out to determine whether and to what extent a statistical distribution of the stochastic component of the compressed target operating signal CST is compatible with or deviates from the output mean value AVG and the output variance V. As a quantitative measure thereof, a particular deviation or a particular reproduction error D is ascertained and returned to the neural network NN for training the neural network NN, as indicated by a dashed-line arrow in FIG. 4. A so-called likelihood function, in particular, can be used as an error function.

During the training of the neural network NN, its neural weights are adjusted in such a way that the reproduction error D and the error function are minimized. A multitude of efficient numerical standard methods are available for this purpose.

Figure 5:
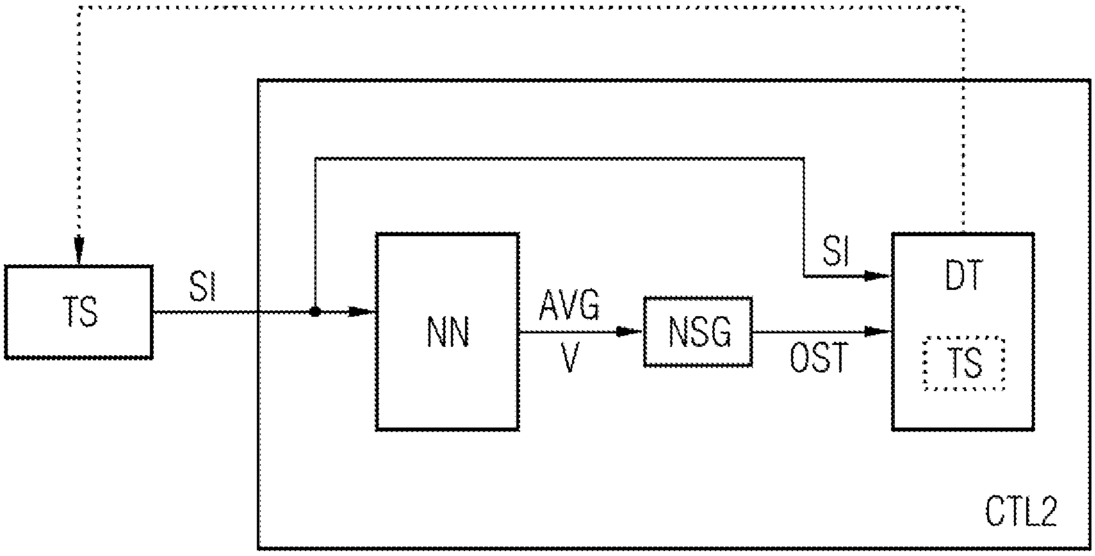
FIG. 5 shows the second control device in an application phase.

FIG. 5 shows the second control device CTL2 with the trained neural network NN in an application phase during the control of a technical system TS. This technical system TS is the same technical system, an identical or similar technical system as the technical system from which the training data CSI and CST originate.

For controlling the technical system TS, the second control device CTL2 detects a current input operating signal SI of the technical system TS and feeds the current input operating signal SI into an input layer of the trained neural network NN. The trained neural network NN then generates statistical characteristic values AVG and V for each data set or each time series point of the current input operating signal SI.

The statistical characteristic values AVG and V are output via the output layer of the trained neural network NN and fed to a noise generator NSG of the second control device CTL2. The noise generator NSG is used to generate random data or, in general, a noise signal, wherein a mean value and a variance of the generated random data are adjustable. In the present exemplary embodiment, the noise generator NSG generates one or multiple output value(s) for each pair of supplied statistical characteristic values, specifically AVG and V in this case, the output value(s) having, on a statistical average, the predefined mean value AVG and the predefined variance. The output values are output by the noise generator NSG as the output signal OST. The output signal OST therefore has a reproduced, indeterministic noise component having a realistic statistical distribution.

As in the first exemplary embodiment, the output signal OST is transmitted as a current target operating signal together with the current input operating signal SI to a digital twin DT of the technical system TS. The digital twin DT can be used to monitor or control the technical system TS, as described above.

Due to the realistically reproduced noise component of the target operating signal OST, substantially more realistic forecasts of a behavior of the technical system TS can be obtained, also with lossy training data. This benefits, in particular, forecasts of a reliability or an operating risk of the technical system TS.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for reproducing noise components of lossy recorded operating signals of a technical system, comprising:

a) lossy recording an input operating signal for a control device of the technical system and a target operating signal for controlling the technical system;

b) on the basis of the recorded operating signals, training a neural network to reproduce a recorded target operating signal and a statistical distribution of a stochastic component of the recorded target operating signal on the basis of a recorded input operating signal;

c) supplying a current input operating signal of the technical system to the trained neural network;

d) generating an output signal having a noise component modelled on the statistical distribution on the basis of the supplied current input operating signal and a noise signal; and e) outputting the output signal as the current target operating signal for controlling the technical system.

2. The method as claimed in claim 1, wherein a Bayesian neural network having latent parameters representing the statistical distribution is used as the neural network;

the latent parameters are inferred by the training;

the noise signal is fed into an input layer of the Bayesian neural network; and the output signal is generated by the Bayesian neural network, which has been trained with the inferred latent parameters, from the current input operating signal and the noise signal.

3. The method as claimed in claim 2, wherein inferring the latent parameters is carried out by a variational inference method and/or by a Markov chain Monte Carlo method.

4. The method as claimed in claim 1, wherein the neural network is trained to reproduce statistical characteristic values of the statistical distribution on the basis of a recorded input operating signal;

the statistical characteristic values are determined for the supplied current input operating signal by the trained neural network; and the noise signal is generated depending on the determined statistical characteristic values and output as an output signal.

5. The method as claimed in claim 4, wherein a likelihood function is used as an error function to be minimized for the training.

6. The method as claimed in claim 4, wherein a mean value, a variance, a standard deviation, a probability value and/or a distribution type of the statistical distribution are used as characteristic values.

7. The method as claimed in claim 1, wherein the current input operating signal is continuously detected and fed to the neural network, and a concurrent simulator is operated by the neural network.

8. The method as claimed in claim 7, wherein the concurrent simulator is a digital twin of the technical system.

9. A control device for controlling a technical system, configured for carrying out the method as claimed in claim 1.

10. A computer program product, comprising a computer readable hardware storage device having computer readable program code stored therein, said program code executable by a processor of a computer system to implement the method as claimed in claim 1.

11. A computer-readable memory medium having a computer program product as claimed in claim 10.

* * * * *